(12) United States Patent
Matsuura et al.

(10) Patent No.: US 6,701,603 B2
(45) Date of Patent: Mar. 9, 2004

(54) METHOD OF MANUFACTURING YOKE OF ELECTRIC ROTATING MACHINE

(75) Inventors: Yoshiaki Matsuura, Kosai (JP); Teruo Sato, Toyohashi (JP); Taketo Shimoda, Toyohashi (JP); Kazuhiko Nagasaka, Hamamatsu (JP); Kazunobu Kanno, Toyohashi (JP); Kouichi Nakamura, Toyohashi (JP); Satoru Iwasaki, Okazaki (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/996,925

(22) Filed: Nov. 30, 2001

(65) Prior Publication Data

US 2002/0074867 A1 Jun. 20, 2002

(30) Foreign Application Priority Data

Dec. 13, 2000 (JP) .......................... 2000-379056
Jun. 8, 2001 (JP) .......................... 2001-174102
Aug. 31, 2001 (JP) .......................... 2001-263496

(51) Int. Cl.[7] .............................................. H02K 15/00
(52) U.S. Cl. .......................... 29/596; 29/421.1; 29/897; 29/DIG. 11; 72/348
(58) Field of Search ....................... 29/596, 897, 421.1, 29/DIG. 11, DIG. 18; 72/348, 347, 349, 350; 310/154.12, 42, 156.26

(56) References Cited

U.S. PATENT DOCUMENTS

| | | | | | |
|---|---|---|---|---|---|
| 5,083,449 | A | * | 1/1992 | Kobayashi et al. | ........... 72/349 |
| 5,175,460 | A | * | 12/1992 | Ishizuka | ............... 310/154.09 |
| 5,237,849 | A | * | 8/1993 | Miyazawa | ................... 72/335 |
| 6,505,492 | B2 | * | 1/2003 | Jroski | .......................... 72/348 |

FOREIGN PATENT DOCUMENTS

| | | |
|---|---|---|
| JP | B2-6-1970 | 2/1987 |
| WO | WO 99/44273 | 9/1999 |

* cited by examiner

Primary Examiner—Carl J. Arbes
Assistant Examiner—T. Phan
(74) Attorney, Agent, or Firm—Posz & Bethards, PLC

(57) ABSTRACT

A cup shaped yoke made of sheet material has an opening portion provided in a side wall on an axial end side, a shoulder portion provided in the sidewall on another axial end side, a magnet installation portion for installing a magnet, which is provided in the side wall between the opening and shoulder portions and whose wall thickness is substantially equal to thickness of the sheet material, and a bottom portion, which is provided in a bottom wall, having a boss shaped bearing accommodating portion in a center thereof. Each wall thickness of the opening, shoulder and bottom portions including the boss shaped bearing accommodating portion is equal to or smaller than a half of wall thickness of the magnet installation portion.

6 Claims, 8 Drawing Sheets

METHOD OF MANUFACTURING YOKE OF ELECTRIC ROTATING MACHINE

CROSS REFERENCE TO RELATED APPLICATION

This application is based upon and claims the benefit of priority of Japanese Patent Applications No. 2000-379056 filed on Dec. 13, 2000, No. 2001-174102 filed on Jun. 8, 2001 and No. 2001-263496 filed on Aug. 31, 2001, the contents of which are incorporated herein by reference.

BACKGROUND OF THE INVENTION

1. Field of the Invention

The present invention relates to a yoke of an electric rotating machine having a magnet installation portion whose wall thickness is locally thicker and a method of manufacturing the same.

2. Description of Related Art

Generally, a magnet installation portion of a motor yoke has a relatively thick wall thickness so that a better magnetic characteristic of motor is secured. If the yoke is formed by a conventional manufacturing method in use of a plate whose thickness is equal to the wall thickness of the magnet installation portion necessary for securing a given magnetic characteristic, wall thickness of a portion of the yoke other than the magnet installation portion tends to become too thick so that a lighter weight motor can not be manufactured since a total weight of the yoke is heavier.

According to another conventional method, a separately provided ring is fitted to an outer cylindrical wall portion of the yoke corresponding to the magnet installation portion, as shown in FIG. 15. In more details, a cylindrical portion 41 of a yoke 40 is made, at first, of a relatively thin thickness plate (original plate) in a given shape. Then, an iron ring 43, whose inner diameter is equal to an outer diameter of the cylindrical portion 41 and whose axial length is substantially equal to an axial length of a magnet installation portion 42 of the cylindrical portion 41, is separately provided and is fitted to the cylindrical portion 41 so as to surround an outer circumference 40a thereof. Thickness of the iron ring 43 is equal to or more than the thickness of the cylindrical portion 41 so that a final wall thickness of the magnet installation portion 42 becomes thicker by twice or more than that of the original plate, resulting in improving the magnetic characteristic of the yoke.

However, the method shown in FIG. 15 has a drawback that the yoke 40 is made of two parts and the two parts have to be assembled so that manufacturing cost of the yoke 40 increases. Further, unless the two parts are manufactured with accurate dimensions, a gap between the two parts is produced. The gap is likely to cause corrosion since an inside of the gap is hardly coated with paint.

Further, it is known to make the thickness of the magnet installation portion partially thicker in such a manner that, while the cylindrical portion of the yoke is formed by drawing, the magnet installation portion is axially compressed through a compression forming process. However, this method still has a drawback that the thickness of the magnet installation potion increases only by 1.3 to 1.6 times than the thickness of the original plate because the thickness increase due to the compression forming process is inherently limited. Accordingly, to make the thickness of the magnet portion largely increase, it is necessary to repeat the compression forming process many times, resulting in increasing a number of the yoke forming processes.

SUMMARY OF THE INVENTION

An object of the invention is to provide a method of forming easily a cup shaped yoke of an electric rotating machine out of a piece of plate at a lower manufacturing cost so that wall thickness of the magnet installation portion is substantially equal to thickness of the plate and, further, wall thickness of the bottom portion, or, preferably, wall thickness of a portion other than the magnet installation portion, is thinner than the thickness of the plate.

Another object of the invention is to provide an integrally formed cup shaped yoke of an electric rotating machine whose side wall has an opening portion, a magnet installation portion and a shoulder portion and whose bottom wall has a bottom portion with a boss for accommodating a bearing in which wall thickness of the magnet installation portion is thicker than thickness of the bottom wall, or, preferably, each thickness of the opening and the shoulder portion.

To achieve the above objects, in a method of manufacturing a cup shaped yoke of an electric rotating machine, whose side wall has an opening portion, a magnet installation portion and a shoulder portion and whose bottom wall has a bottom portion with a boss, out of a piece of plate, the plate is locally bulged to form a first worked plate having a semispherical protrusion by pressing a first area of the plate, after firmly holding the plate around an outside of the first area with a first holding force so that wall thickness of the first semispherical protrusion is thinner than a thickness of the plate.

Then, the first worked plate is drawn to form a second worked plate having a first cup by pressing a second area of the first worked plate at and around an outside of the semispherical protrusion, whose diameter is larger than that of the first area, after holding the first worked plate around an outside of the second area with a second holding force that is lower than the first holding force so that thickness of a bottom wall of the first cup is thinner than the wall thickness of the semispherical protrusion and a thickness of a side wall of the first cup is substantially equal to the thickness of the plate.

After that, the bottom wall of the first cup is bulged to form the boss in a center thereof.

According to the method mentioned above, the cup shaped yoke is easily manufactured so that the thickness of the side wall is substantially equal to the thickness of the original plate and thicker than the thickness of the bottom wall.

Alternatively, the cup shaped yoke may be manufactured as follows.

At first, the plate is drawn to form a first worked plate having a first cup by pressing a second area of the plate, after holding the plate around an outside of the second area with a second holding force so that each wall thickness of a side wall and a bottom wall of the first cup is substantially equal to thickness of the plate.

Then, the first worked plate is bulged to form a second worked plate whose bottom wall has a semispherical protrusion by pressing a first area of the bottom wall of the first cup, whose diameter is smaller than that of the second area, after firmly holding the first worked plate around an outside of the first area with first holding force that is higher than the second holding force so that wall thickness of the semispherical protrusion of the second worked plate is thinner than that of the bottom wall of the first cup of the first worked plate and wall thickness of a side wall of the second worked plate is substantially equal to that of the side wall of the first cup of the first worked plate.

After that, the bottom wall including the semispherical protrusion of the second worked plate is bulged to form the boss in a center thereof.

This method will also effective to easily manufacture the cup shaped yoke.

It is preferable in both methods mentioned above that the diameter of the second area is larger than an inside diameter of the cup shaped yoke. In this case, as a next step after forming the second worked plate, while holding a third area of the bottom wall of the first cup of the second worked plate, whose diameter is smaller than that of the second area, the second worked plate is further drawn to form a third worked plate having a second cup whose inside diameter is smaller than that of the first cup and whose axial length is longer than that of the first cup by pressing the second worked plate at an outer periphery of the bottom wall of the first cup axially along an outer circumference of the third area. Accordingly, the outer periphery of the bottom wall of the second worked plate is moved to constitute a part of a side wall of the third worked plate.

Furthermore, it is preferable that the third worked plate is further deformed to form a fourth worked plate by ironing opposite axial circumferential edges of the side wall of the second cup so that the fourth worked plate has the magnet installation portion, the opening portion and the shoulder portion in which each wall thickness of the opening and shoulder portions is thinner than the wall thickness of the magnet installation portion. Preferably, each wall thickness of the opening and shoulder portions is not higher than a half of the wall thickness of the magnet installation portion.

It is preferable that an outer circumference of the shoulder portion and an inner circumference of the opening portion are ironed.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First embodiment)

Figure 1:
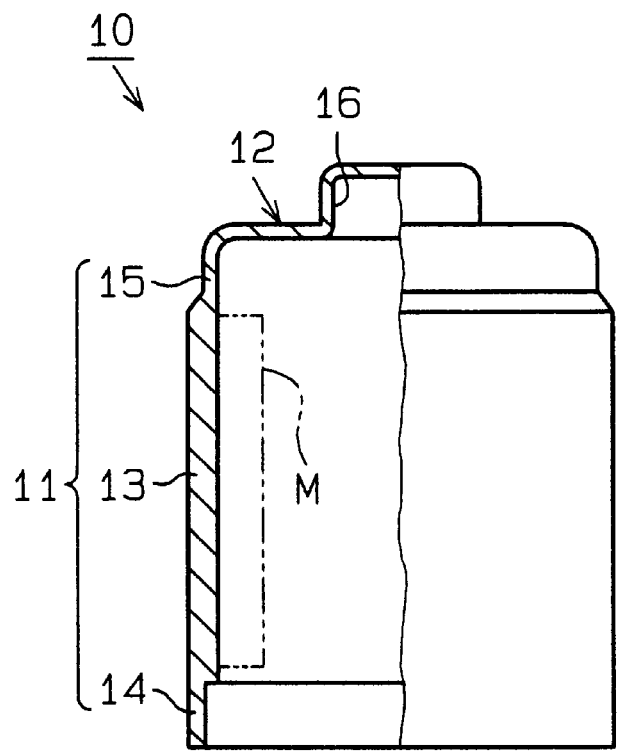
FIG. 1 is a cross sectional view of a motor yoke according to a first embodiment of the present invention.
Figure 2:
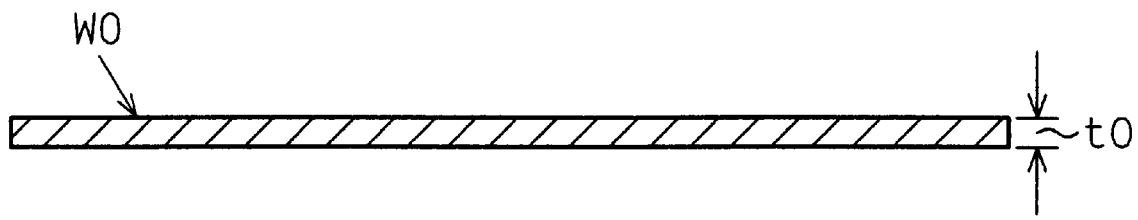
FIG. 2 is a cross sectional view of an original plate for forming the motor yoke of FIG. 1.

A motor yoke as a typical example of an electric rotating machine according to a first embodiment of the present invention and its manufacturing method are described with reference to FIGS. 1 to 8. FIG. 1 shows a cross sectional view of the motor yoke. FIG. 2 shows a cross sectional view of a sheet material out of which the motor yoke is formed.

As shown in FIG. 1, the motor yoke (hereinafter called yoke) 10 is formed in a cup shape and has a cylindrical wall 11 and a bottom wall 12.

The cylindrical wall 11 is composed of a magnet installation portion 13 whose wall is thick, an opening portion 14 whose inside wall is thinned and a shoulder portion 15 which is located between the magnet installation portion 13 and the bottom wall 12 and whose outside wall is thinned. The bottom wall 12 is provided in the center with a bearing accommodating portion (boss) 16 which is formed by bulging a part thereof. Wall thickness of the bottom wall 12, which is thin and substantially equal to that of the opening portion 14 or that of the shoulder portion 15, is about one half (½) of that of the magnet installation portion 13.

An axial length of the magnet installation portion 13 is slightly longer than that of a magnet M (shown by a two dots slash line in FIG. 1) that is to be installed on an inner circumferential surface of the cylindrical wall 11. The axial length of the magnet installation portion 13 may be equal to that of the magnet M.

The yoke 10 is formed by pressing steel sheet material (apiece of plate) W0 through a plurality of forming processes (6 processes in the first embodiment). Thickness t0 of the plate W0 is substantially equal to the wall thickness of the magnet installation portion 13.

A method of manufacturing the yoke out of the plate W0 is described with reference to FIGS. 3 to 8.

Figure 3:
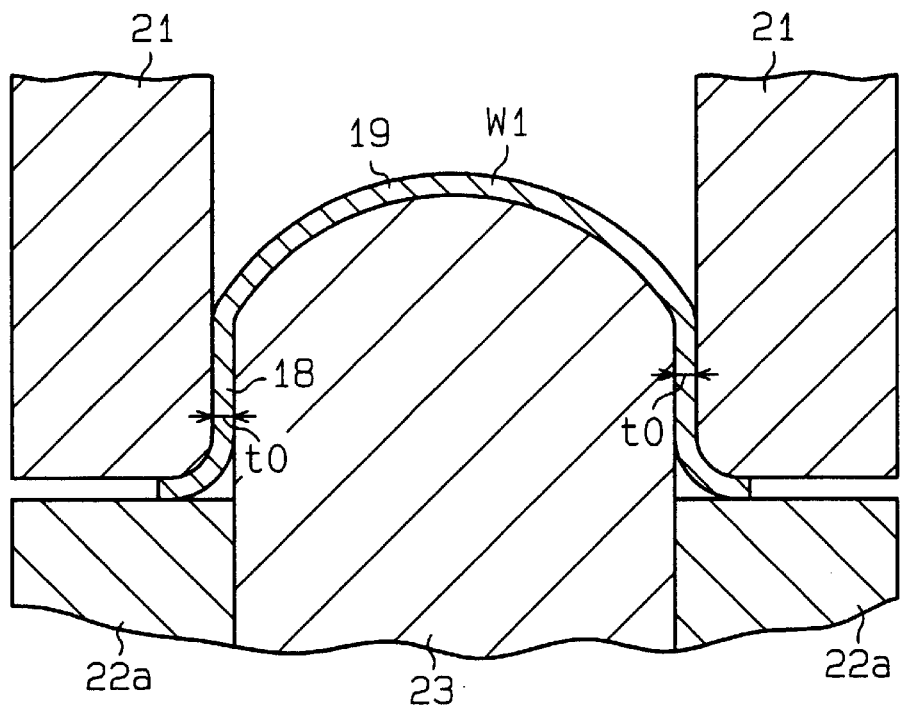
FIG. 3 is a cross sectional view of a first worked plate after a first cup formation process according to the first embodiment.

A first cup formation process is described with reference to FIG. 3. At first, after the plate W0 is sandwiched between and held by a holder 21 and a first cushion plate 22a with a first holding force that is commonly used for a drawing process, the plate W0 is drawn to form a first cup shaped member (first worked plate W1) having a cylindrical portion 18 and a bottom portion 19 by pressing a part of the plate W0 with a first punch 23, whose diameter is larger than an inner diameter of the cylindrical wall 11 and whose head is formed in a semispherical shape. Wall thickness t0 of the cylindrical portion 18 or the bottom portion 19 is substantially equal to that of the plate W0.

Figure 4:
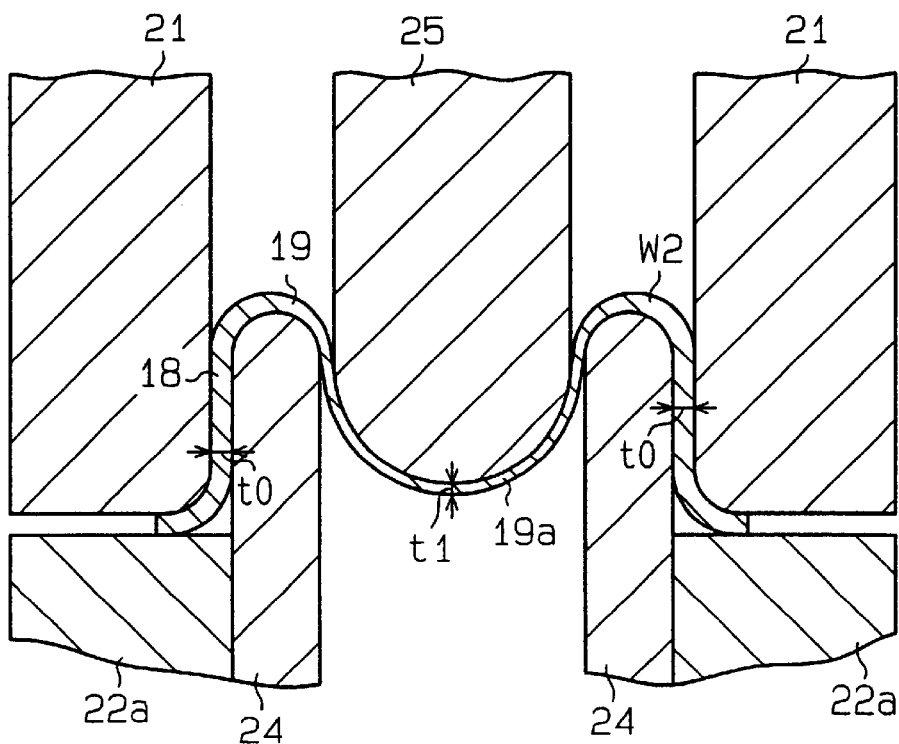
FIG. 4 is a cross sectional view of a second worked plate after a reverse bulge formation process according to the first embodiment.

Next, a reverse bulge formation process is described with reference to FIG. 4. After removing the first punch 23, the first worked plate W1 is sandwiched between and held firmly by the holder 21 and the first cushion plate 22a with a second holding force stronger than the first folding force. Then, the first worked plate W1 is bulged in reverse to form a second worked plate W2 having a first semispherical protrusion 19a protruding inward out of the bottom portion 19 by pressing the bottom portion 19 opposite to a drawing direction of the first cup formation process with a second punch 25, while an outer periphery of the bottom portion 19 around an outside of the second punch 25 is supported by a first die 24. The second worked plate W2 has the cylindrical portion 18 whose wall thickness t0 is substantially same as that of the first worked plate W1 and the bottom portion 19 which is provided with the first semispherical protrusion 19a and whose wall thickness t1 is thinner than the thickness t0 of the first worked plate W1.

Figure 5:
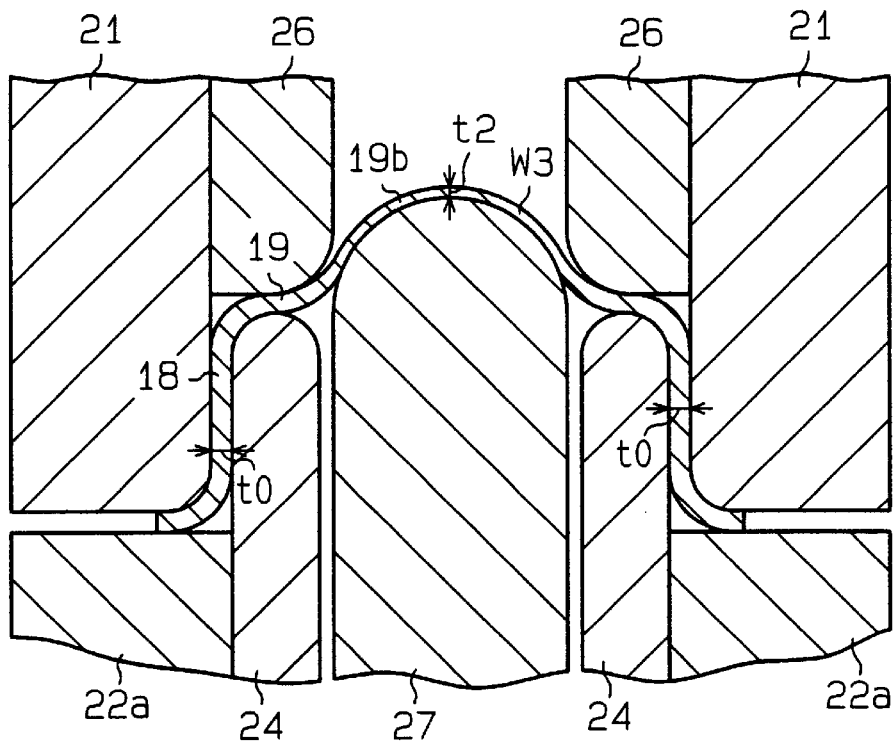
FIG. 5 is a cross sectional view of a third worked plate after a bulge formation process according to the first embodiment.

A bulge formation process is described with reference to FIG. 5. Keeping a state that the second worked plate W2 is sandwiched between and held by the holder 21 and the first cushion plate 22a with the second holding force, the second worked plate W2 is bulged to form a third worked plate W3 having a second semispherical protrusion 19b protruding outward out of the bottom portion 19 by pressing the first semispherical portion 19a in a direction same to the drawing direction of the first cup formation process with a third punch 27, while the bottom portion 19 around an outside of the third punch 27 is firmly held by a second die 26 in addition to the first die 24. Accordingly, without changing the wall thickness t0 of the cylindrical portion 18 of the second worked plate W2, wall thickness t2 of the second semispherical protrusion 19b is thinner than the wall thickness t1 of the first semispherical protrusion 19a.

Figure 6:
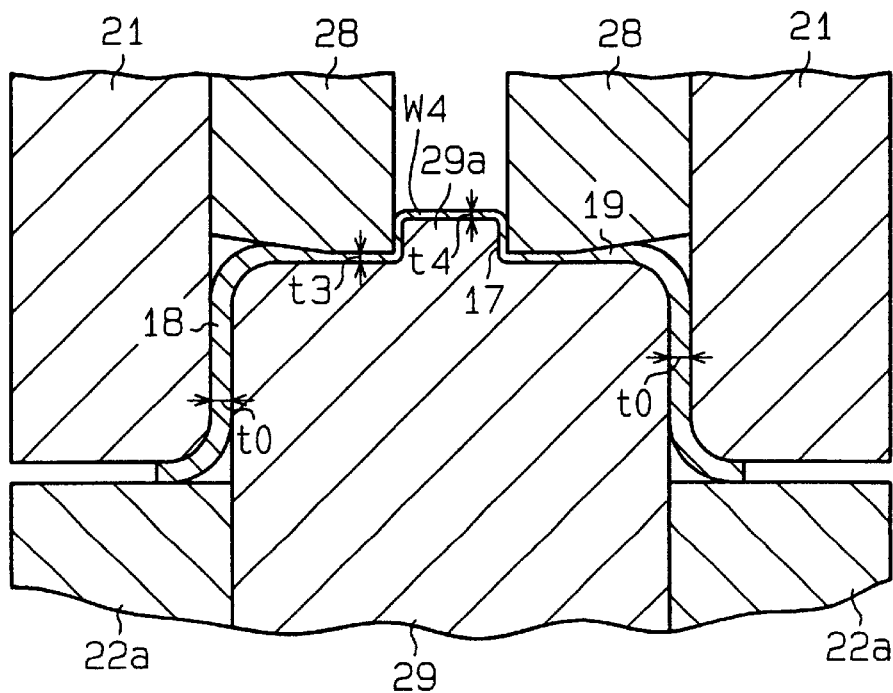
FIG. 6 is a cross sectional view of a fourth worked plate after a boss formation process according to the first embodiment.

Next, a boss formation process is described with reference to FIG. 6. After removing the first and second dies 24 and 26 and the third punch 27, the third worked plate W3 is sandwiched between and held by the holder 21 and the first cushion plate 22a with a third holding force stronger than the first holding force. Then, a bottom wall of the third worked plate W3 is partly bulged to form a fourth worked plate W4 having a boss 17 outward protruding out of the bottom portion 19 by pressing the bottom portion 19 including the second semispherical portion 19b with a third cylindrical die 28, whose inner diameter is equal to outer diameter of the boss 17, and a fourth punch 29, whose head is provided with a projection 29a whose outer diameter is equal to inner diameter of the boss 17. Wall thickness t0 of the cylindrical portion 18 is not changed. Wall thickness t3 of the bottom portion 19 of the fourth worked plate W4 or wall thickness t4 of the boss 17 thereof is thinner than the wall thickness t2 of the second semispherical portion 19b. The thickness t3 and the thickness t4 may be same. The boss 17 is formed in the same shape as the bearing accommodating portion 16 of the yoke 10.

Figure 7:
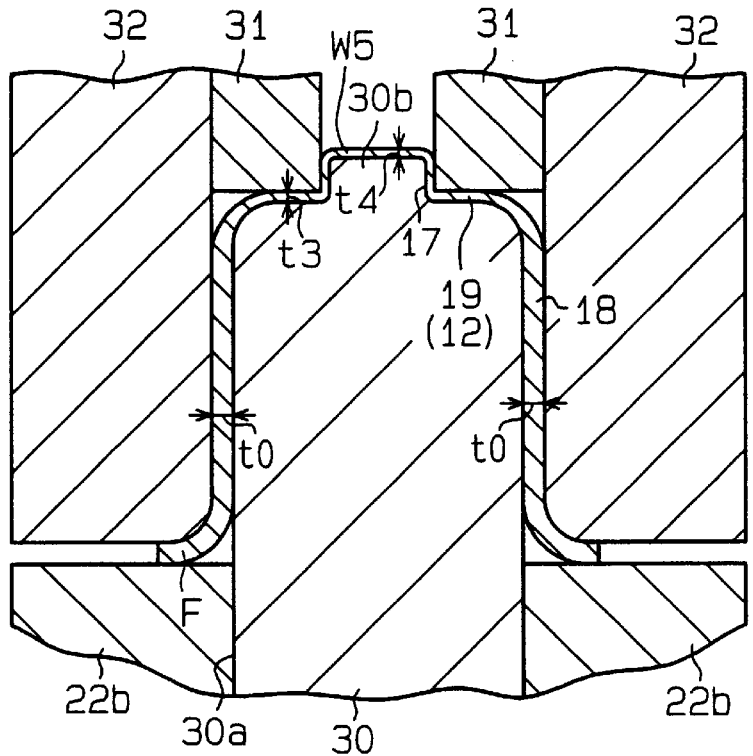
FIG. 7 is a cross sectional view of a fifth worked plate after a second cup formation process according to the first embodiment.

A second cup formation process is described with reference to FIG. 7. After removing the third die 28 and the fourth punch 29, the fourth worked plate W4 is sandwiched between and held by a first knockout punch 31 and a fifth punch 30, which is provided with a cylindrical portion 30a whose diameter is smaller than the diameter of the first punch 23 and slightly larger than an inner diameter of the cylindrical wall 11 and is also provided in a center of a head thereof with a projection 30b whose shape is same as that of the projection 29a, and, then, the holder 21 and the first cushion plate 22a are removed.

After that, the fourth worked plate w4, while being firmly held by the first knockout punch 31 and the fifth punch 30, is further drawn to form a fifth worked plate W5 having a second cup by pressing an outer periphery of the bottom portion 19 of the fourth worked plate W4 outside the first knockout punch 31 axially along an outer circumference of the fifth punch 30 with a cylindrical die 32 until a flange F of the second cup is firmly sandwiched between the cylindrical die 32 and a second cushion plate 22b. Accordingly, the outer periphery of the bottom portion 19 of the fourth worked plate W4 is moved to constitute a part of a cylindrical wall 18 of the fifth worked plate W5. The remaining part of the bottom portion 19 of the fourth worked plate W4, which is sandwiched between the knockout punch 31 and the fifth punch 30, is formed in the same shape as the bottom wall 12 of the motor yoke 10. A middle part of the cylindrical portion 18 of the fifth worked plate W5 constitutes the magnet installation portion 13 of the yoke 10.

Figure 8:
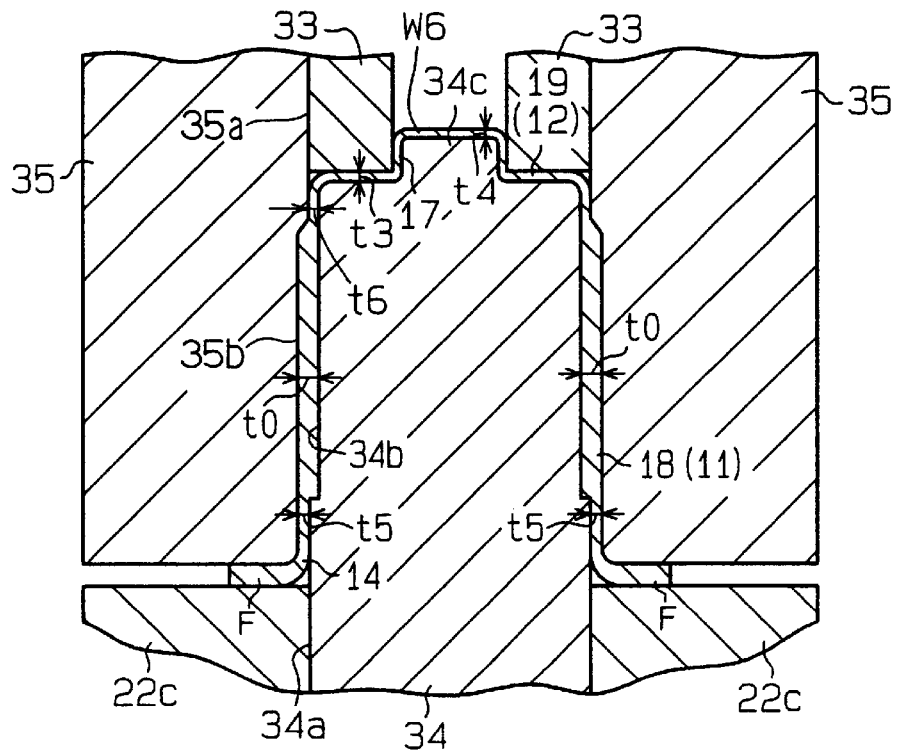
FIG. 8 is a cross sectional view of a sixth worked plate after an opening portion formation process according to the first embodiment.

An opening portion formation process is described with reference to FIG. 8. After removing the second cushion plate 22b and the first knockout punch 31, the fifth worked plate W5 is sandwiched between and held by a third cushion plate 22c and a second knockout punch 33, whose outer diameter is smaller than that of the first knockout punch 31 and equal to an outer diameter of the shoulder portion 15, and, then, the fifth punch 30 and the cylindrical die 32 are removed.

After that, while the bottom portion 19 and the flange F of the cylindrical portion 18 are firmly held by the second knockout punch 33 and the third cushion plate 22c, the fifth worked plate W5 is ironed to form a sixth worked plate W6 having a cylindrical portion 18 whose wall thickness on an opening side is t5, whose wall thickness in a middle portion is t0, and whose wall thickness on a bottom side is t6, by pressing opposite axial edges of the cylindrical portion 18 in opposite axial directions with a sixth punch 34 and a fifth die 35. The sixth punch 34 is provided with a large diameter portion 34a whose outer diameter is equal to an inner diameter of the opening portion 14, a small diameter portion 34b whose outer diameter is equal to an inner diameter of the magnet installation portion 13 or the shoulder portion 15, and a projection 34c whose shape is same as that of the projection 29a. The fifth die 35 is provided with a small diameter inner cylindrical portion 35a whose inner diameter is equal to the outer diameter of the shoulder portion 15 and a large diameter inner cylindrical portion 35b whose inner diameter is equal to an outer diameter of the magnet installation portion 13 or the opening portion 14. Accordingly, the cylindrical portion 18 of the sixth worked plate W6 is formed in a shape same as that of the cylindrical wall 11 of the yoke 10. The wall thickness t5 or the wall thickness t6 may be equal to the wall thickness t3 or t4.

Finally, the flange F of the sixth worked plate W6 is cut so that a final shape of the yoke 10 is formed.

In the formation processes mentioned above, the reverse bulge formation process, in which the thin wall of the first semispherical protrusion 19a is formed, may be omitted. In this case, the third punch 27 presses a center part of the bottom portion 19, instead of the first semispherical portion 19a, to form a shape of the third worked plate W3.

According to the first embodiment mentioned above, the yoke 10 has a better magnetic characteristic with lighter weight since the wall thickness of the magnet installation portion 13 is thicker and each wall thickness of the bottom wall 12, the opening portion 14 and the shoulder portion 15 is thinner. The wall thickness of the magnet installation portion 13 may be thicker by twice or more than the each wall thickness of the bottom wall 12, the opening portion 14 and the shoulder portion 15.

Since the wall thickness t0 of the magnet installation portion 13 is substantially equal to that of the sheet material (original plate) W0, it is not necessary to more increase the thickness of the original plate in such a manner that the cylindrical portion is axially compressed. Accordingly, the yoke 10 according to the first embodiment is formed with a better manufacturing productivity and at a lower manufacturing cost.

Further, compared to the conventional yoke formed by two parts, that is, a ring and a cup, the yoke 10 according to the first embodiment has a better corrosion resistance and better dimensional accuracy.

Moreover, since the bottom wall is formed basically by bulging in such a manner that the plate is pressed by a punch while the plate around the outside of the punch is firmly held with first folding force stronger than second folding force to be generally used for drawing, it is very easy to make the wall thickness of the bottom wall thinner.

(Second embodiment)

Figure 9:
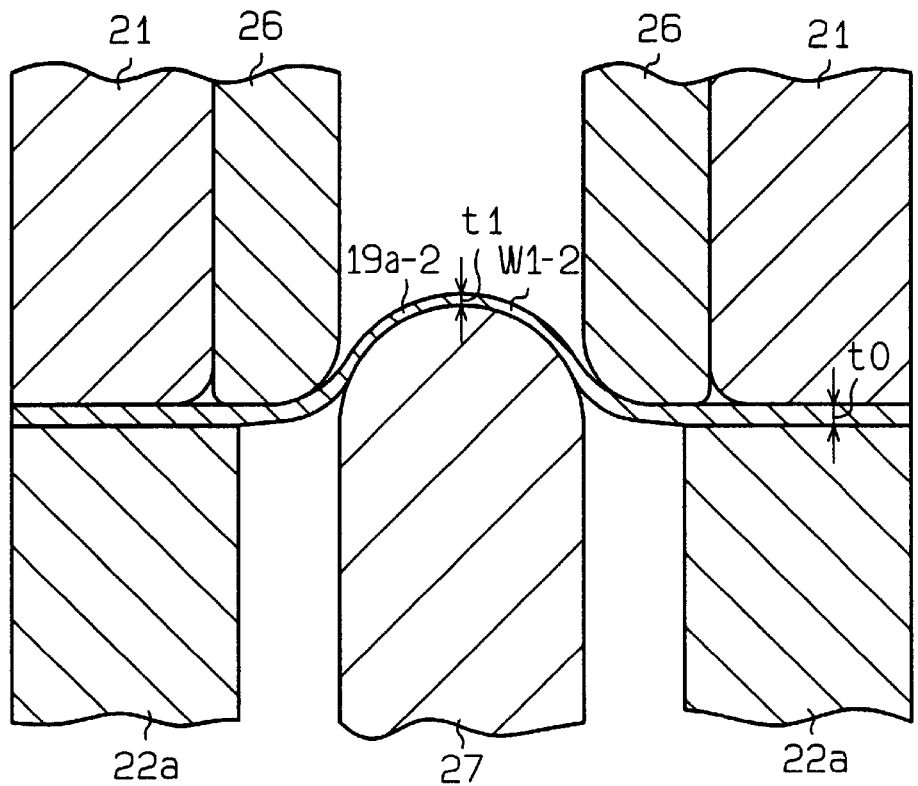
FIG. 9 is a cross sectional view of a first worked plate after a first bulge formation process according to a second embodiment.
Figure 10:
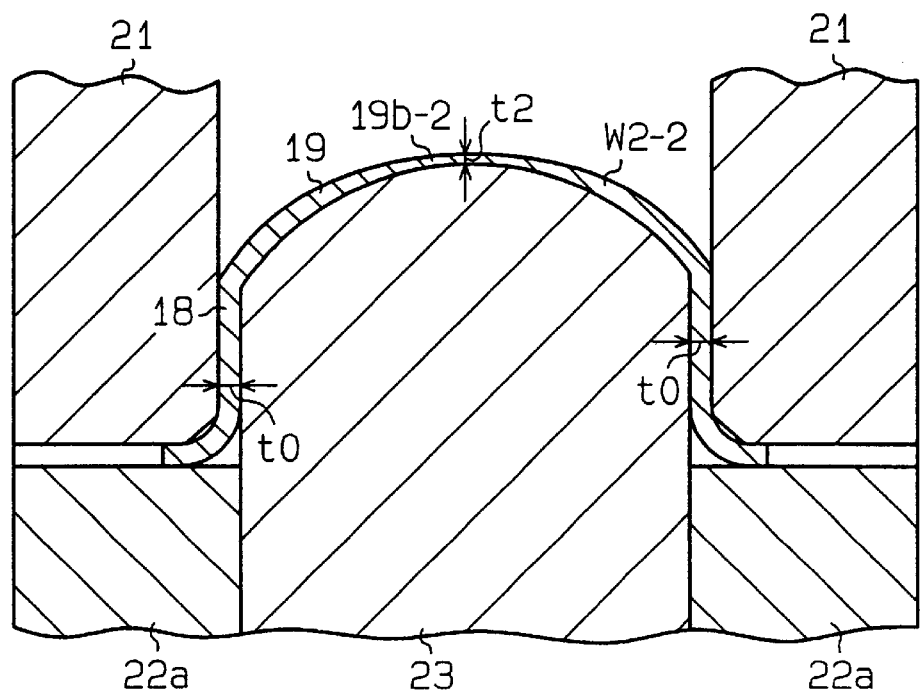
FIG. 10 is a cross sectional view of a second worked plate after a first cup formation process according to the second embodiment.

Another method of manufacturing the yoke 10 according to a second embodiment is described with reference to FIGS. 9 and 10. According to the first embodiment, the reverse bulge formation process and the bulge formation process are performed after the first cup formation process. However, according to the second embodiment, a first bulge formation process is performed at first and, then, the first cup formation process is performed. Subsequently, the boss formation process, the second cup formation process and the opening portion formation process, which are same as those according to the first embodiment, are performed.

The yoke 10 according to the second embodiment is formed by pressing steel sheet material (a piece of plate) W0 through 5 formation processes.

A first bulge formation process is described with reference to FIG. 9. At first, after the plate W0 is sandwiched between and held firmly by the holder 21 and the first cushion plate 22a with the second holding force stronger than the first holding force that is commonly used for a drawing process, and, further, the plate W0 is supported by the second die 26, the plate W0 is partly bulged with the third punch 27, whose diameter is smaller than an inner diameter of the cylindrical wall 11 and whose head is formed in a semispherical shape, to form a first worked plate W1-2 having a first semispherical protrusion 19a-2 outward protruding out of the plate W0. The first worked plate W1-2 has the first semispherical protrusion 19a-2 whose center wall thickness t1 is thinner than the thickness t0 of the plate W0.

Next, the first cup formation process is described with reference to FIG. 10. After removing the second die 26 and the third punch 27, while the first worked plate w1-1 is sandwiched between and held by the holder 21 and the first cushion plate 22a with the first holding force that is commonly used for a drawing process, the first worked plate w1-1 is drawn with the first punch 23, whose diameter is larger than an inner diameter of the cylindrical wall 11 and whose head is formed in a semispherical shape, to form a first cup shaped member (second worked plate W2-2) having the cylindrical portion 18 and a second semispherical protrusion 19b-2 by pressing the first worked plate W1-2 at and around an outside of the first semispherical projection 19a-2 in a direction same to the bulging direction of the bulge formation process with the first punch 23 whose diameter is larger than an inner diameter of the cylindrical wall 11 and whose head is formed in a semispherical shape. The second semispherical projection 19b-2 constitutes the bottom portion 19. Wall thickness t0 of the cylindrical portion 18 is substantially same as that of the plate W0 and wall thickness t2 of the second semispherical projection 19b-2 (the bottom portion 19) is thinner than the wall thickness t1 of the first semispherical projection 19a-2.

Since the boss formation process, the second cup formation process and the opening portion formation process are substantially same as those of the first embodiment, explanations thereof are omitted.

Figure 11:
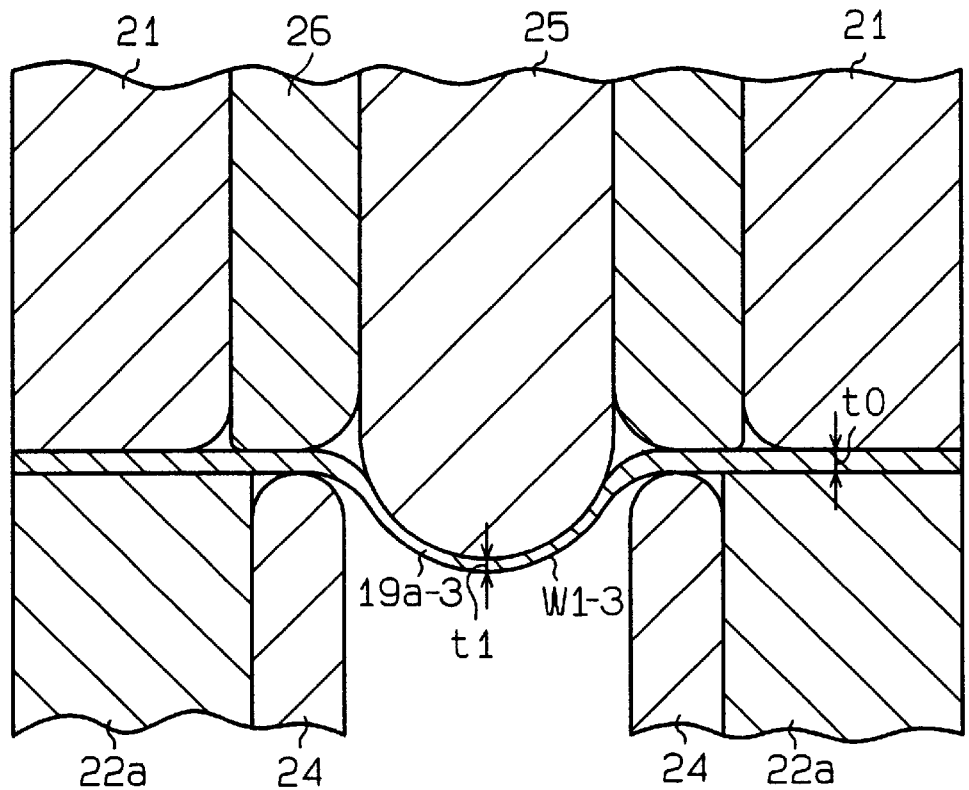
FIG. 11 is a cross sectional view of a first worked plate after a modified first bulge formation process according to the second embodiment.

Further, in the method according to the second embodiment, the first bulge formation process may be modified as follows. As shown in FIG. 11, after the plate W0 is sandwiched among and held firmly by the holder 21 the first cushion plate 22a and the second die 26 with the second holding force, the plate W0 is further supported by the first die 24. Then, the plate W0 is partly bulged in reverse to form a first worked plate W1-3 having a first semispherical protrusion 19a-2 inward protruding out of the plate W0 by pressing the plate W0 opposite to the drawing direction of the subsequent first cup formation process as shown in FIG. 10 with the second punch 25, that is, opposite to a bulging direction shown in FIG. 9.

(Third embodiment)

A motor yoke according to a third embodiment and its manufacturing method are described with reference to FIGS. 12 to 13D.

Figure 12:
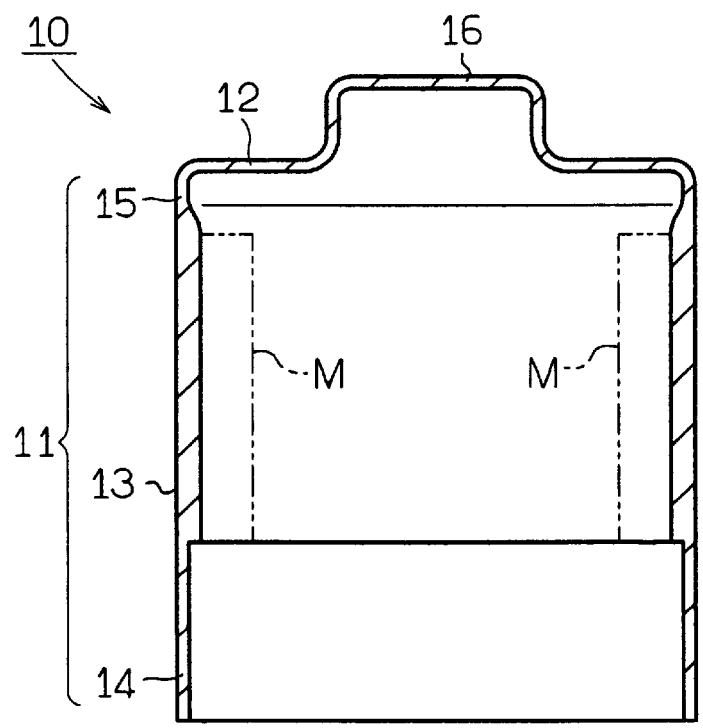
FIG. 12 is a cross sectional view of a motor yoke according to a third embodiment of the present invention.

As shown in FIG. 12, a motor yoke 11 according to the third embodiment has a cylindrical wall 11, which is composed of a magnet installation portion 13 whose wall is thick, an opening portion 14 whose inside wall is thinned and a shoulder portion 15 whose inside wall is also thinned, and a bottom body 12 provided with a boss (a bearing accommodating portion) 16.

A method of manufacturing the motor yoke 10 according to the third embodiment is described with reference to FIGS. 13A to 13D. The yoke 10 according to the third embodiment is formed by pressing steel sheet magnetic material (a piece of plate) W0 having better ductility.

Figure 13A:
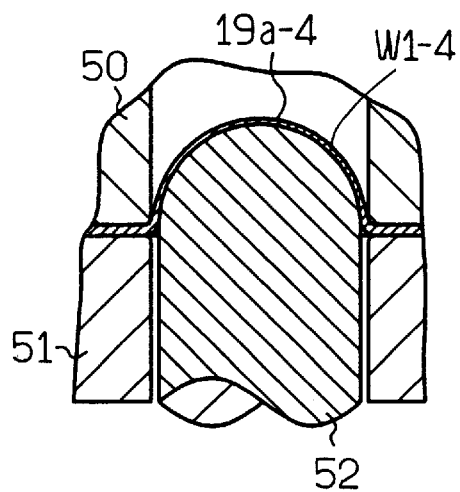
FIGS. 13A to 13D are cross sectional views showing a method of manufacturing the motor yoke according to the third embodiment.

As shown in FIG. 13A, after the plate W0 is held firmly by a first die 50 and a second die 51 with a second folding force stronger than force to be commonly used for drawing process, the plate W0 is bulged to form a first worked plate W1-4 having a semispherical protrusion 19a-4 by pressing a center of the plate W0 with a first punch 52. As material flow of the plate W0 on a flange side is restricted by the second folding force, wall thickness of the semispherical protrusion 19a-4 is thinner than original thickness of the plate W0 and is substantially equal to wall thickness of the bottom wall 12 of the yoke 10. Further, a diameter of a base of the semispherical protrusion 19a-4 is substantially equal to a final diameter of the bottom wall 12.

Figure 13B:
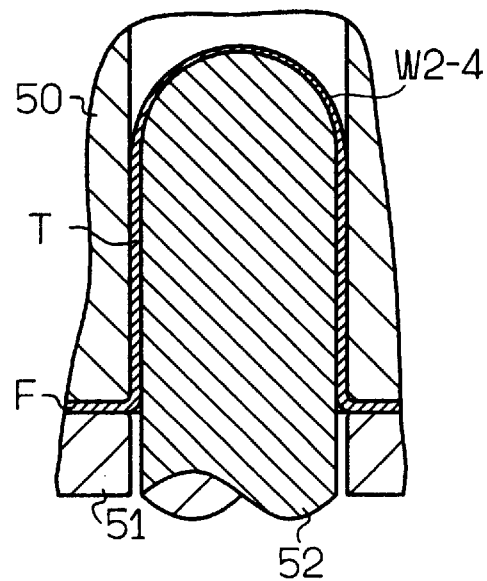

Then, as shown in FIG. 13B, while the first worked plate W1-4 is held by the first and second dies 50 and 51 with a first folding force that is commonly used for the drawing process, the first worked plate W1-4 is deep drawn to form a second worked plate W2-4 by pressing the semispherical protrusion 19a-4 with the first punch 52 so as to further protrude out of the flange F. Wall thickness of a side wall T of the second worked plate W2-4 is substantially equal to final thickness of the magnet installation portion 13 of the yoke 10. Axial length of the side wall T is substantially equal to an axial length of the cylindrical wall 11 of the yoke 10.

Figure 13C:
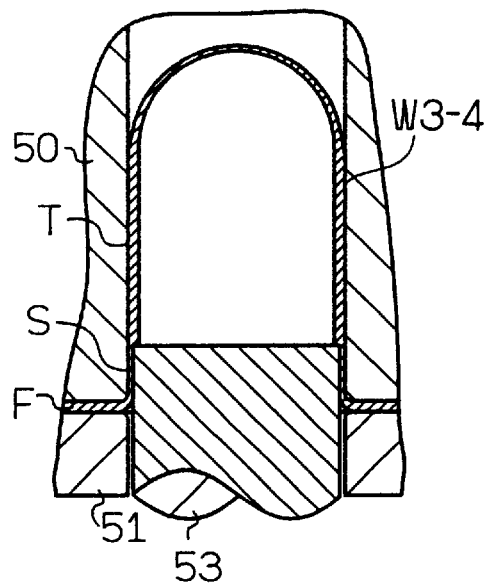

Further, as shown in FIG. 13C, the second worked plate w2-4 is firmly held by the first and second dies 50 and 51 with the second holding force stronger than usual, the second worked plate W2-4 is ironed to form a third worked plate W3-4 by pressing axially an axial periphery edge of the side wall T from an opening side thereof with a second punch 53, whose diameter is larger than inner diameter of the side wall T and smaller than outer diameter of the side wall T. Accordingly, a thin thickness portion S of the side wall T, whose wall thickness is substantially equal to the wall thickness of the opening portion 14, is formed. Axial length of the thin thickness portion S is substantially equal to axial length of the opening portion 14.

Figure 13D:
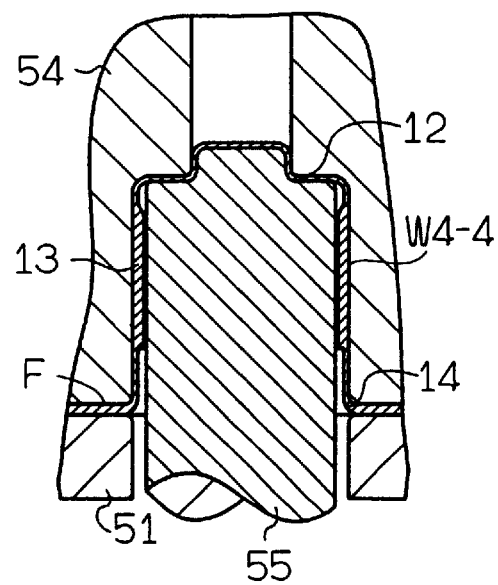

After that, as shown in FIG. 13D, the third worked plate W3-4 is shaped to form a fourth worked plate W4-4 having final shapes of the bottom wall 12 and the shoulder portion 15 by pressing the semispherical protrusion 19a-4 with a third die 54 and a third punch 55.

Finally, the flange F extending outward from the opening portion 14 is cut.

According to the third embodiment, the magnet installation portion 13 is formed so as protrude inward out of an inner circumference of the cylindrical wall 11 so that positioning of the magnet M on the magnet installation portion 13 is easy.

Figure 14:
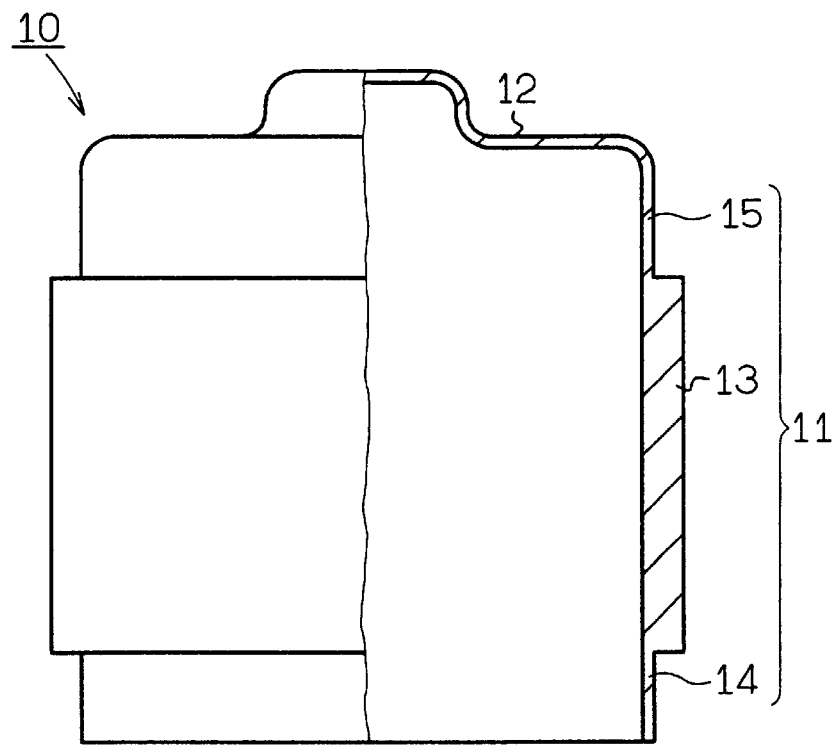
FIG. 14 is a cross sectional view of a modified motor yoke according to the third embodiment.
Figure 15:
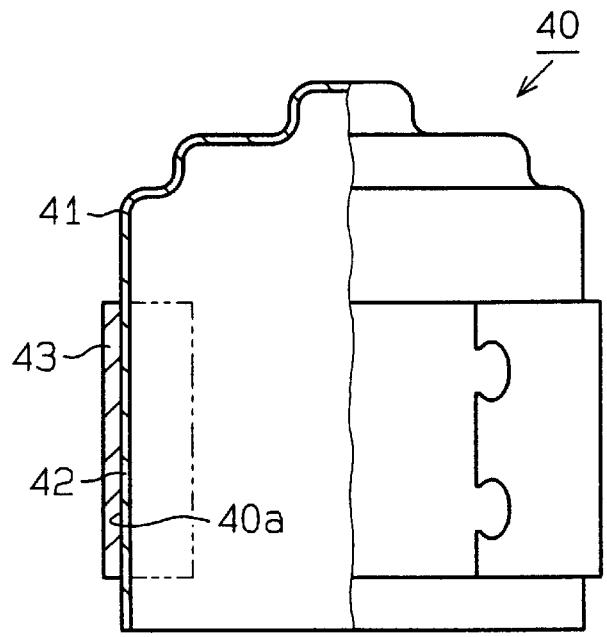
FIG. 15 is a cross sectional view of a conventional motor yoke as a prior art.

Further, instead of forming the magnet installation portion 13 so as to protrude inward, the magnet installation portion 13 may be formed so as to protrude outward out of outer circumference of the cylindrical wall 11, as shown in FIG. 14.

Furthermore, in the first to third embodiments, a cross sectional shape of the cylindrical wall 11 is not limited to circular ring but may be any ring shape whose cross section is, for example, square or oval.

Moreover, the bottom wall 12 may be formed to protrude outward in two steps bulge shape. Further, a gist of the present invention is applicable not only to the motor yoke but also any yoke of an electric rotating machine.

What is claimed is:

1. A method of manufacturing a cup shaped yoke of an electric rotating machine, whose side wall has an opening portion, a magnet installation portion and a shoulder portion and whose bottom wall has at least a boss, out of a piece of plate, comprising:

bulging the plate locally to form a first worked plate having a semispherical protrusion by pressing a first area of the plate, after firmly holding the plate around an outside of the first area with a first holding force, so that the wall thickness of the first semispherical protrusion is less than the thickness of the plate, drawing the first worked plate to form a second worked plate having a first cup by pressing a second area of the first worked plate at and around an outside of the semispherical protrusion, the diameter of which is larger than that of the first area, after holding the first worked plate around an outside of the second area with a second holding force, which is lower than the first holding force, so that the thickness of a bottom wall of the first cup is less than the wall thickness of the semispherical protrusion, and the thickness of a side wall of the first cup is substantially equal to the thickness of the plate, wherein the wall thickness of the side wall is equal to the thickness of the plate and greater than the thickness of the bottom wall, and the diameter of the second area is larger than the inside diameter of the cup shaped yoke;

bulging the bottom wall of the first cup to form the boss in a center thereof; and further drawing the second worked plate, while holding a third area of the bottom wall of the first cup of the second worked plate, the diameter of which is smaller than that of the second area, to form a third worked plate having a second cup, the inside diameter of which is smaller than that of the first cup and the axial length of which is greater than that of the first cup, by pressing the second worked plate at an outer periphery of the bottom wall of the first cup axially along an outer circumference of the third area, wherein the outer periphery of the bottom wall of the second worked plate is moved to constitute a part of a side wall of the third worked plate.

2. A method of manufacturing a cup shaped yoke of an electric rotating machine according to claim 1, further comprising steps of:

deforming the third worked plate to form a fourth worked plate by ironing opposite axial circumferential edges of the side wall of the second cup so that the fourth worked plate has the magnet installation portion, the opening portion and the shoulder portion in which each wall thickness of the opening and shoulder portions is thinner than the wall thickness of the magnet installation portion.

3. A method of manufacturing a cup shaped yoke of an electric rotating machine according to claim 2, wherein neither of the respective wall thicknesses of the opening and shoulder portions is greater than a half of the wall thickness of the magnet installation portion.

4. A method of manufacturing a cup shaped yoke of an electric rotating machine having a cylindrical magnet installation portion and a central bearing accommodating portion, comprising:

holding a piece of plate, which has a uniform thickness, at a peripheral portion between a die and a cushion plate;

bulging a central portion of the piece of plate with a first punch, the outside diameter of which is smaller than the inside diameter of the cylindrical magnet installation portion, while holding a portion of the piece of plate adjacent to the first punch to form a first worked plate that has a semispherical protrusion, wherein the wall thickness of the semispherical protrusion is less than the uniform thickness of the piece of plate;

drawing the first worked plate with a second punch, the outside diameter of which is larger than the inside diameter of the cylindrical magnet installation portion to form a second worked plate having a cylindrical portion and a bottom portion, wherein the wall thickness of the bottom portion is less than the wall thickness of the cylindrical portion; and bulging the bottom portion of the second worked plate with a third punch, the outside diameter of which is equal to the inside diameter of the central bearing accommodation portion.

5. A method according to claim 4, wherein: the die used in holding the piece of plate comprises a holder for holding the peripheral portion of the piece of plate and a supporting die for supporting a middle portion of the piece of plate opposite to the first punch, and the first punch is moved in a direction from the cushion plate toward the supporting die to hold and press the middle portion in the step of bulging a central portion of the piece of plate.

6. A method according to claim 5, wherein the piece of plate is held between the holder and the cushion plate with a stronger holding force when bulging the central portion than when performing the drawing.

* * * * *